US005485796A

United States Patent [19]
Bassett

[11] Patent Number: 5,485,796
[45] Date of Patent: Jan. 23, 1996

[54] APPARATUS FOR MARKING SOIL

[75] Inventor: James H. Bassett, Sycamore, Ill.

[73] Assignee: Dawn Equipment Company, Sycamore, Ill.

[21] Appl. No.: 215,912

[22] Filed: Mar. 22, 1994

[51] Int. Cl.⁶ .......................... A01B 39/14; A01B 69/02
[52] U.S. Cl. ............................................. 111/33; 172/126
[58] Field of Search .......................... 111/33, 52, 99; 172/2, 126, 130, 430, 456, 117, 128, 131, 132, 5, 776

[56] References Cited

U.S. PATENT DOCUMENTS

| | | | |
|---|---|---|---|
| 4,063,597 | 12/1977 | Day | 172/126 |
| 4,147,305 | 4/1979 | Hunt | 172/271 X |
| 4,530,405 | 7/1985 | White | 172/126 |
| 4,674,578 | 6/1987 | Bexten et al. | 172/126 |
| 4,825,957 | 5/1989 | White et al. | 172/126 |
| 4,986,367 | 1/1991 | Kinzenbaw | 172/126 |
| 5,027,525 | 7/1991 | Haukaas | 172/126 X |
| 5,255,617 | 10/1993 | Williams et al. | 172/540 X |
| 5,379,847 | 1/1995 | Snyder | 172/126 X |

Primary Examiner—Terry Lee Melius
Assistant Examiner—Robert Pezzuto
Attorney, Agent, or Firm—Arnold, White & Durkee

[57] ABSTRACT

An apparatus to be advanced in a travel direction by a vehicle to continuously mark underlying soil. The apparatus has an elongate body with first and second portions and leading and trailing surfaces. Structure is provided at a first location on the elongate body for engaging and marking underlying soil as the soil marking apparatus is advanced over underlying soil. Structure is provided for connecting the elongate body to a vehicle to advance the soil marking apparatus over underlying soil. First structure cooperates between the first and second elongate body portions to allow the first portion of the elongate body to reposition relative to the second portion of the elongate body upon the first portion of the elongate body being acted upon by a predetermined force applied in the first direction at a first point. The first cooperating structure includes a first element having a predetermined tensile strength, structure for operatively engaging the first element with each of the first and second portions of the elongate body so that a force in excess of the predetermined force applied to the first elongate body portion at the first point in the first direction causes the first element to fail in tension, and second structure cooperating between the first and second elongate body portions to allow the first elongate body portion to move guidingly relative to the second elongate body portion under a force applied to the first elongate body portion at the first point in the first direction with the first element failed in tension. The first element resides between the leading and trailing surfaces of the elongate body.

23 Claims, 5 Drawing Sheets

APPARATUS FOR MARKING SOIL

BACKGROUND OF THE INVENTION

1. Field of the Invention

This invention relates to agricultural equipment and, more particularly, to an apparatus to be advanced by a vehicle to continuously produce a visible mark in underlying soil to provide a frame of reference for the vehicle driver.

2. Background Art

In conventional tilling processes, soil is uniformly treated throughout an entire field that is to be planted. Residue from a prior year's crop is broken up and mixed with the soil. Subsequently, a towing vehicle draws soil additive and planting equipment over the tilled soil to produce evenly spaced planting rows.

The first pass over the filled soil dictates the row orientation. The vehicle operator thereafter guides the vehicle by making visual reference to the line of the previously planted rows to ideally produce uniform spacing of rows throughout a field.

This is a relatively inconvenient process in that it requires the operator to divide his/her attention between the front of the vehicle, to avoid any obstructions, and the back of the vehicle, to be certain that the line of the rows in process remains parallel to, and spaced the desired distance from, existing rows. This back and forth movement may cause operator fatigue. While with some crops row placement accuracy is not critical, those crops planted using a grain "drill" i.e. wheat, beans, etc., are normally spaced sufficiently close together that deviation from the desired row spacing may cause a significant decrease in the crop yield.

It is also known to advance a marker through underlying soil as the vehicle is advanced. Typically, the marker projects laterally from the vehicle, or an attachment being drawn thereby, to be dragged through the soil to produce a gauge line as seed is planted or additive applied. After the initial pass, the operator can steer off of this gauge line while looking forwardly as he/she would in normally operating the vehicle.

However, when modem tilling techniques are utilized, other problems arise which must be contended with even when a marker is employed. There has been a growing concern about preserving top soil, which can be done by at all times leaving a blanket of residue on the soil between rows. Whereas these "no till" techniques were once optional, the U.S. government is now requiring that top soil remain at all times intact over a certain portion of active fields.

As a result, the wheel producing the marks must be dragged through residue, rather than cleared, loosened soil. Less than a clearly defined mark may result with conventional markers.

This problem can be alleviated to a certain extent by utilizing a heavier marker or skewing the wheel axis so that the wheel is caused to dig a wider trough, which serves as the marking line. However, by increasing the down pressure on the wheel or increasing the resistance to passage through the soil by increasing the width of the mark, the structure supporting the wheel may become severely stressed. As a result, a heavier than desirable construction may be required, which adds to the cost of the marker and may complicate repositioning and folding of the marking structure, which takes place when the towing vehicle is being transported from site to site or reconfigured for storage.

One type of conventional marker utilizes an elongate boom, which projects in cantilever fashion from the towing vehicle. A rotatable wheel is provided on the distal end of the boom. The wheel is self propelled as it is dragged through the underlying soil. The wheel orientation can be varied from a position wherein the axis thereof is substantially parallel to the length of the boom, which produces a very narrow cut in the soil, to a position wherein the axis makes a substantial angle with the boom length, so that a relatively wide trough is formed in the soil.

Many existing markers are constructed with a "breakaway feature". Part or all of the boom is constructed to reposition upon a predetermined force being applied thereto, as when an obstruction is encountered by the wheel. This avoids damage to the marker and the equipment to which the marker is attached.

Some of these markers utilize bolts which are severed in shear upon a predetermined force being applied to the distal end of the boom. Markers utilizing this arrangement may have less than consistent performance. In normal use, the shear pin or bolt may progressively wear away so that it becomes weakened to the point that it will fail prematurely or under a force that is less than the desired breakaway force.

This shear arrangement is also less predictable than desired in light of the number of variables that are involved. For example, sharp comers on two elements moving in shear may effect shearing of the pin/bolt at a lesser force than would elements having more rounded edges.

It is also known to utilize a pin/bolt that is designed to fail in tension upon the wheel encountering a predetermined resistance. In one form, a vertically extending pin extends through cooperating knuckles at the trailing end of two boom portions so that the outermost portion with the wheel thereon can pivot towards the vehicle, as upon encountering an obstruction. The tension bolt/pin extends through plates at a location forwardly of the boom. The bolt/pin is aligned with the length of the boom so that the hinge bolt/pin at the rear portion of the body of the boom serves as a fulcrum to convert the rearward force on the wheel into substantially an axial force on the bolt/pin.

With this arrangement, the tension pin/bolt is substantially aligned with the neutral axis of the boom. As a result, it does not significantly resist bending loads applied to the boom in use. Further, in those apparatus in which the boom can be raised and/or folded, the lifting force is transmitted primarily through the hinge pin i.e. the tension bolt/pin does not significantly rigidify the boom.

Another problem with the conventional arrangement described above is that separate boom configurations must be made for right- and left-handed use so that the pivot axis is properly located in a trailing position on the boom. Since many markers are retrofit to existing equipment, this is potentially inconvenient for the user and requires that the manufacturer keep an inventory of anticipated left- and right-handed markers. In the case of the user, the user may want to mark on only one side at a time. He/she must nonetheless purchase a right- and left-handed marker to have the ability to mark on both sides.

SUMMARY OF THE INVENTION

In one form of the invention, apparatus is provided to be advanced in a travel direction by a vehicle to continuously mark underlying soil. The apparatus has an elongate body with first and second portions and leading and trailing surfaces. Structure is provided at a first location on the elongate body for engaging and marking underlying soil as the soil marking apparatus is advanced over underlying soil.

Structure is provided for connecting the elongate body to a vehicle to advance the soil marking apparatus over underlying soil. First structure cooperates between the first and second elongate body portions to allow the first portion of the elongate body to reposition relative to the second portion of the elongate body upon the first portion of the elongate body being acted upon by a predetermined force applied in the first direction at a first point. The first cooperating structure includes a first element having a predetermined tensile strength, structure for operatively engaging the first element with each of the first and second portions of the elongate body so that a force in excess of the predetermined force applied to the first elongate body portion at the first point in the first direction causes the first element to fail in tension, and second structure cooperating between the first and second elongate body portions to allow the first elongate body portion to move guidingly relative to the second elongate body portion under a force applied to the first elongate body portion at the first point in the first direction with the first element failed in tension. The first element resides between the leading and trailing surfaces of the elongate body.

In a preferred form, the structure that marks the underlying soil is a rotary wheel, which can be made with teeth to enhance its soil cutting ability.

In one form, the elongate body has a top and bottom and the first element is on one of the top and bottom of the elongate body.

The first element may have a length that is parallel to the lengthwise axis of the elongate body and vertically aligned therewith between the leading and trailing surfaces of the elongate body.

The first structure may include a second element having a predetermined tensile strength, with structure being provided for operatively engaging the second element which each of the first and second portions of the elongate body so that a force in excess of a second predetermined force applied to the first elongate body portion in the first direction at the first point causes the first and second elements to fail in tension so that the first elongate body portion can be moved guidingly relative to the second elongate body portion.

In one form, the first and second elements are on diametrically opposite sides of the lengthwise axis of the elongate body. Preferably, the first and second elements are on the top and bottom of the elongate body.

A repositionable/removable structure can be provided to act between the first and second elongate body portions to prevent the first element from failing in tension as a result of the predetermined force being applied in the first direction at the first point on the first elongate body portion. The repositionable/removable structure may be a pin extending through aligned bores in the first and second elongate body portions.

In one form, the second structure is constructed to allow the first elongate body portion to pivot relative to the second elongate body portion about a substantially vertically extending axis. The second structure may include a first pin extending through aligned bores in the first and second elongate body portions. The second structure can include a second pin extending through aligned bores in the first and second elongate body portions, with the first and second pins being on diametrically opposite sides of the axis of the elongate body.

The second structure can be made to allow the first elongate body portion to pivot relative to the second elongate body portion selectively about first and second different vertically extending axes. With this arrangement, the apparatus for continuously marking soil can be used selectively on opposite sides of a vehicle to which it attaches, i.e. for left- and right-handed operation.

The invention further contemplates the combination of the above structure with a mounting frame to which the elongate body is mounted for pivoting movement. A flexible line can extend between the frame and elongate body to limit movement of the elongate body relative to the frame in one pivoting direction.

The invention further contemplates the above structure in combination with a vehicle for advancing the apparatus for continuously marking soil over underlying soil. Structure is provided at a second location on the elongate body for attaching the elongate body to the vehicle. A reinforcing shoulder can be provided on the vehicle for bearing against the elongate body at a third location between the first and second locations as the elongate body is advanced by the vehicle. The elongate body is unsupported at the third location.

In one form, the first structure resides between the shoulder on the vehicle and the first location.

In another form of the invention, an apparatus for continuously marking soil is provided having an elongate body with first and second portions and leading and trailing surfaces. Structure is provided at a first location on the elongate body for engaging and marking underlying soil as the soil marking apparatus is advanced. Structure is provided for connecting the elongate body to a vehicle to advance the soil marking apparatus. First structure cooperates between the first and second elongate body portions for allowing the first portion of the elongate body to reposition relative to the second portion of the elongate body upon the first portion of the elongate body being acted upon by a first predetermined force applied in a first direction at a first point on the first elongate body portion. Repositionable structure acts between the first and second elongate body portions for a) preventing the first elongate body portion from repositioning relative to the second portion of the elongate body upon the first portion of the elongate body being acted upon by the first predetermined force in the first direction with the repositionable structure in a first position relative to the elongate body and b) allowing the first elongate body portion to reposition relative to the second portion of the elongate body upon the first portion of the elongate body being acted upon by the first predetermined force at the first point in the first direction with the repositionable means in a second position relative to the elongate body.

The repositionable means can include a first pin extending through first aligned bores in the first and second elongate body portion.

The first pin in the first position defines a first pivot axis for relative movement between the first and second elongate portions. The first structure includes a removable second pin extending through aligned second bores in the first and second body portions to define a second pivot axis for relative movement between the first and second elongate body portions. The first and repositionable structures allow the first portion of the elongate body to reposition relative to the second portion of the elongate body upon the first portion of the elongate body being acted upon by a second predetermined force applied oppositely to the first direction at a first point on the first elongate body portion. Accordingly, with the first pin in the first position and the second pin removed, the first elongate body portion pivots relative to the second elongate body portion upon a force in excess of the second predetermined force acting oppositely to the first direction at the first point on the first elongate body portion. With the second pin extending through the second aligned bores and the first pin removed, the first elongate body portion pivots relative to the second elongate body portion upon a force in excess of the first predetermined force acting in the first direction at the first point on the first elongate body portion.

In one form, the first portion of the elongate body repositions relative to the second portion of the elongate by pivoting and there is structure cooperating between the first and second elongate body portions for limiting pivoting movement of the first elongate body portion relative to the second elongate body portion in response to the first predetermined force being applied in the first direction at the first point on the first elongate body portion.

DETAILED DESCRIPTION OF THE DRAWINGS

Figure 1:
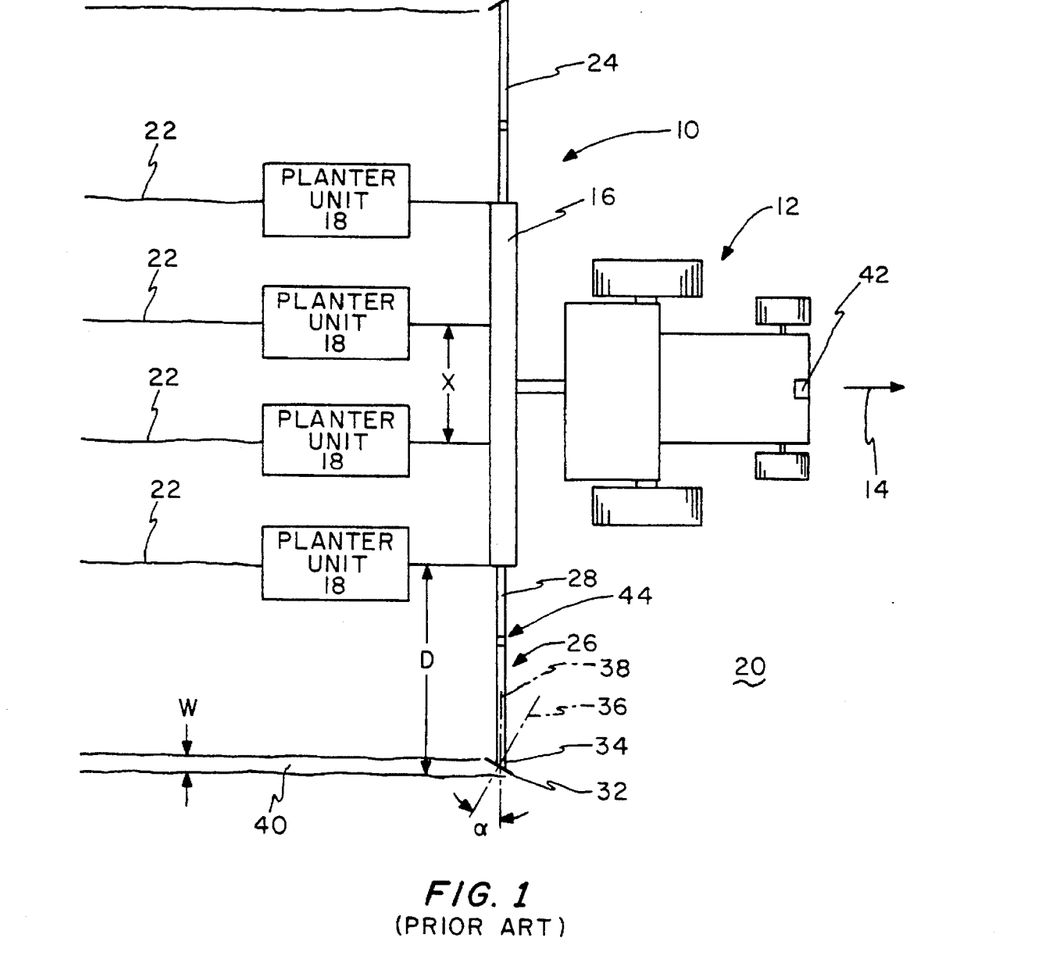
FIG. 1 Is a schematic plan view of a towing vehicle drawing a series of laterally spaced planter units with left- and right-handed soil marking apparatus operatively connected thereto.

In FIG. 1, a planting system is shown at 10, to include a towing vehicle at 12 which is movable in the direction of the arrow 14. The towing vehicle 12 attaches to a frame 16, which is in turn connected to a plurality of planter units 18, which are simultaneously dram in side-by-side relationship over underlying soil 20 by the vehicle 12. The planter units 18 are spaced from each other in a lateral direction a distance X to produce uniformly spaced seed rows 22 in the soil 20 as the vehicle 12 is advanced. While four units 18 are shown, any number of such units 18 could be connected to and simultaneously drawn by the vehicle 12.

Since multiple passes of the system 10 over a field are required, it is necessary to guide the vehicle 12 so that the seed row 22 defined by the outermost planter unit 18 is spaced a distance X from the adjacent existing seed row 22. To facilitate this, soil marking apparatus 24, 26 are provided on the frame 16. The apparatus 24 is a left-handed unit while the apparatus 26 is a right-handed unit. Since the left- and right-handed soil marking apparatus 24, 26 are functionally the same, only exemplary apparatus 26 will be described with reference to FIGS. 1–3.

Figure 2:
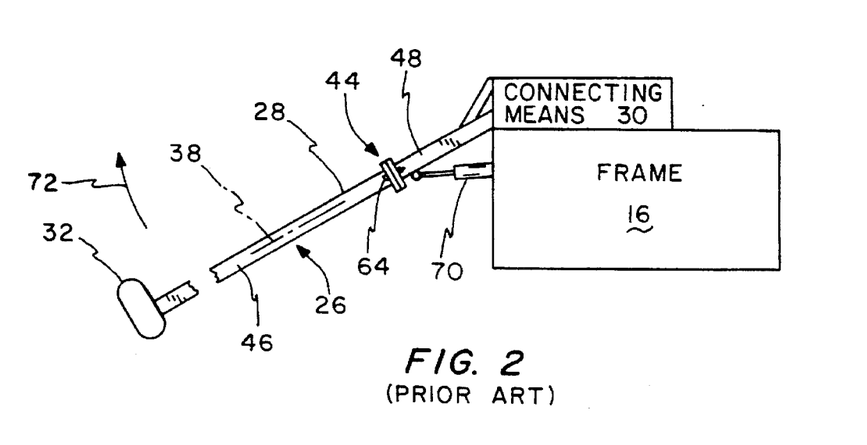
FIG. 2 is a schematic, from elevation view of a conventional soil marking apparatus, including a breakaway feature, operatively associated with a towing vehicle.

The soil marking apparatus 26 includes an elongate boom 28 that is connected by a means, shown schematically at 30, to the frame 16 to project therefrom in cantilever fashion. A disk/wheel 32 is mounted to the distal end 34 of the boom 28 to engage underlying soil 20 to be rotated thereby about a horizontal extending axis 36. The disk/wheel 32 is mounted to the boom 28 so that the angle a defined between the wheel axis 36 and the lengthwise, central axis 38 of the boom 28, is variable.

With the disk/wheel axis 36 substantially parallel to the boom axis 38, the wheel 32 creates a narrow cut in the underlying soil 20. By increasing the angle $\alpha$, the wheel 32 is caused to create a trough 40 having a substantial width W.

In soil where the surface is dry and underlying soil is moist, a narrow trough 40 may suffice. However, in high residue soil 20 and/or soil 20 that is dry to a substantial depth, the width of the trough. 40 may have to be increased to make it visible to an operator in the cab of the vehicle 12.

Once the soil 20 is marked by the wheel 32, the trough 40 is used by the operator of the vehicle 12 to visually guide the vehicle 12 relative to an earlier formed seed row 22. More specifically, a sight 46, which may be a simple "V" shape, is provided on the front portion of the towing vehicle 12 to be readily visible to an operator in the cab of the vehicle 12. The operator keeps the trough 40 in between the legs of the "V" on the sight 46. The operator can thus form rows 22 that are spaced consistently from existing rows 22.

The length of the boom 28 is variable, as by providing telescoping parts, to select the distance D between the center line of the outermost planter unit 18 and the trough 40 so that the outermost seed rows 22 on successive passes are spaced from the existing rows 22 a desired distance X (FIG. 1).

Since the distance D may be large, a substantial torque is exerted on the connecting means 30. While the connecting means 30 can be engineered to withstand normal loading, this loading may be significantly increased as, for example, when the wheel 32 encounters an obstruction, such as a rock, a root, or thoroughly hardened soil.

Figure 3:
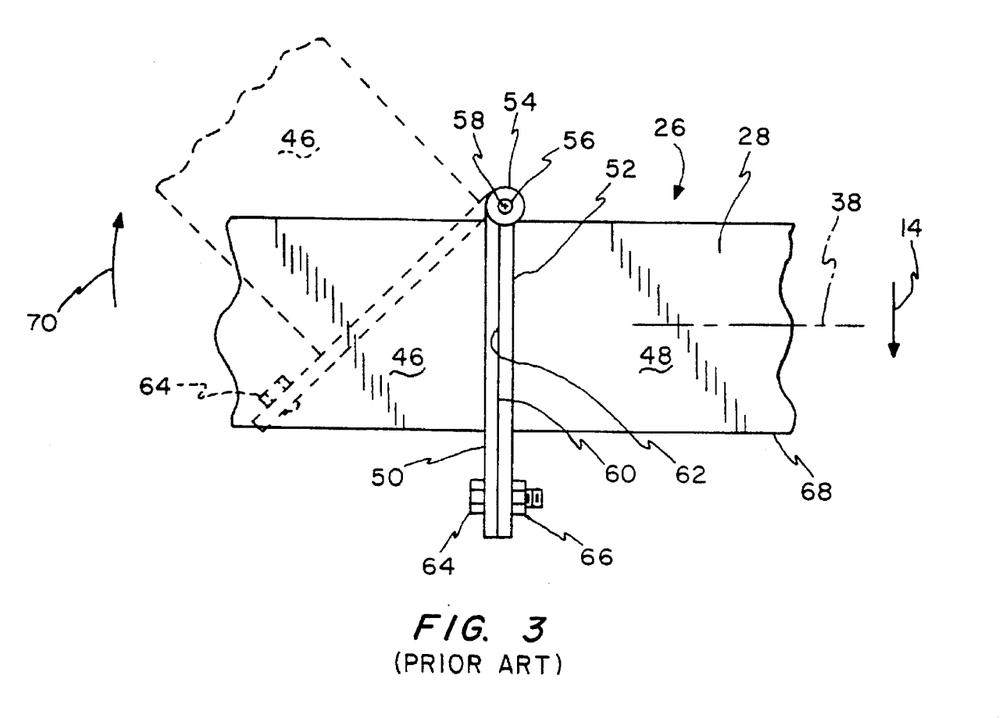
FIG. 3 is an enlarged, fragmentary, plan view of breakaway structure on the soil marking apparatus in FIG. 2.

To avoid bending of the boom 28 or damaging of the connecting means 30 or frame 16, a breakaway connection is provided at 44. The breakaway connection 44 allows an outer portion 46 of the boom 26 carrying the wheel 32 to reposition relative to an inner portion 48 of the boom 28.

The boom portion 46 has an enlarged plate 50 welded thereto. The boom portion 48 has a similar plate 52 welded thereto. The plates 50, 52 have integrally formed knuckles 54 which have openings that are alignable to accept a pin 56 to define a vertical pivot axis 58 for relative movement between the boom portions 46, 48.

The boom portions 46, 48 are pivotable between a normal, operating position, wherein a flat surface 60 on the plate 50 facially abuts a flat surface 62 on the plate 52, and a released position, shown in phantom in FIG. 3. The plates 50, 52 are maintained in abutting relationship by a bolt 64 and nut 66. The bolt 64 extends through the plates 50, 52 at a location spaced forwardly from the leading surface 68 of the boom 28 with the length of the bolt 64 being substantially parallel to the central axis 38 of the boom 28.

The bolt 64 is selected so that a predetermined force applied in the trailing direction upon the wheel 32 will cause the bolt 64 to fail in tension. Once the bolt 64 fails, the rearward force on the wheel 32 causes the boom portion 46 to pivot about the axis 58 in the direction of the arrow 70 in a trailing direction.

Since the length of the bolt 64 is aligned vertically with the central/neutral axis 38 of the boom 28, the bolt 64 contributes little in terms of resisting bending forces applied to the boom 28 in operation.

An hydraulic cylinder 70 acts between the frame and the boom 28 and is extendable to pivot the boom 28 upwardly in the direction of the arrow 72 to a compacted storage position. The boom 28 may be segmented so that it can be folded into two or more parts and nested in the frame 16. Due to the location of the bolt 64, this lifting force is transmitted from the boom portion 48 principally through the trailing hinge connection defined by the knuckles 54 and pin 56.

Another problem with the prior art boom 28 is that it can be used on only one side of the towing vehicle 12. The right-handed apparatus 26 must be modified by reversing the location of the bolt 64 and hinge connection for left-handed use. Consequently, two different styles of boom 28 are required to be inventoried and kept on hand by the operator if vehicle guidance is to be carded out from both sides.

The inventive apparatus for marking soil is shown at 80 in FIGS. 5–10. The apparatus 80 has a boom 82, including an elongate body 84 having leading/trailing surfaces 86, 88.

The body 84 has a first portion 90, which attaches to the vehicle frame 16, and a second portion 92 which is joined to the first portion 90 through a breakaway connection 94, made according to the present invention.

The second, distal body portion 92 is in mm segmented to facilitate folding. More particularly, the second body portion 92 includes a first section 96 and a second section 98 which are joined at a connection 100 that permits relative pivoting movement about a horizontal, fore and aft axis.

At the distal end 102 of the section 98, a wheel assembly 104 is attached. The wheel assembly 104 includes a toothed wheel 106 which is rotatable about an axis 108 as it engages and is dram over underlying soft. The teeth 110 on the wheel 106 break up the soil 20 to provide a more visible mark than would be produced with an untoothed disk.

The wheel 106 is attached to the body section 98 through a connection at 112 that allows the angle between the wheel axis 108 and the lengthwise, neutral axis 114 of the body 84 to be varied. This permits adjustment of the wheel cutting width, as described with respect to the prior art apparatus in FIGS. 1–3 herein. A cylindrical depth ting 116 has an outer surface 118 that abuts to the soil 20 to limit the mount of penetration by the wheel 106 in use.

The proximal end 120 of the body 84 is connected to a mounting frame 122 which is in turn fixedly connected to the frame 16 on, or carded by, the vehicle 12. The body 84 is connected to the mounting frame 122 through a pivot pin 124 which allows the body 84 to pivot about a fore and aft axis. The body 84 is allowed to float in operation about the axis defined by the pivot pin 124.

Downward pivoting of the body 84 is limited by a flexible line 126 that connects between the mounting frame 122 and an arm 128 connected to the midportion of the body 84. A turnbuckle 130 can be used to adjust the effective length of the flexible line 126 to select the downwardmost position of the body 84.

The weight of the body 84 and the wheel assembly 104 dictate the downward force exerted by the wheel 106 on the underlying soil 20. The body 84 is made from square steel channel to give it the necessary weight and also to give it the rigidity necessary to withstand loading in operation.

The breakaway connection 94 prevents damage to the body 84, the mounting frame 122 and the vehicle frame 16. The breakaway connection 94 defines a means cooperating between the body portions 90, 92 for allowing the body portion 92 to reposition relative to the body portion 90 upon the wheel 106 being acted upon by a predetermined force applied in the trailing direction.

A connecting plate 132 is attached to the distal end 134 of the body portion 90. A similar plate 136 is attached to the proximal end 138 of the body portion 92. The plate 132 has a flat surface 140 that facially engages a flat surface 142 on the body portion 92 with the body portions 90, 92 in the operative relationship shown in FIG. 6.

According to the invention, the apparatus 80 is made for universal i.e. left- and right-handed, operation. To accomplish this, the body portions 90, 92 are connected so that the body portion 92 is pivotable relative to the body portion 90 about a first vertical axis 144, for left-handed operation, and a second vertical axis 146, for right-handed operation.

V-shaped reinforcing plates 148, 150 are provided on the top and bottom surfaces 152, 154 on the body portion 90. Since the operation of the reinforcing plates 148, 150 is the same, one exemplary plate 148 will be described.

The plate 148 has spaced legs 156, 158 which project lengthwise of the body 84 beyond the plate surface 140. The leg 156 has a bore 160 and the leg 158 a bore 162 to accommodate a bolt 164.

Figure 6:
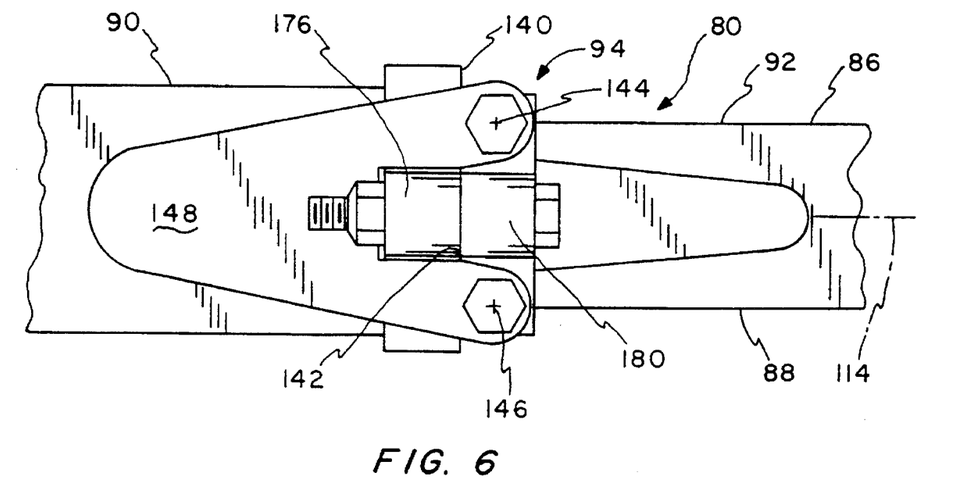
FIG. 6 is an enlarged, fragmentary, plan view of a breakaway connection between first and second portions of an elongate body on the inventive soil marking apparatus.
Figure 7:
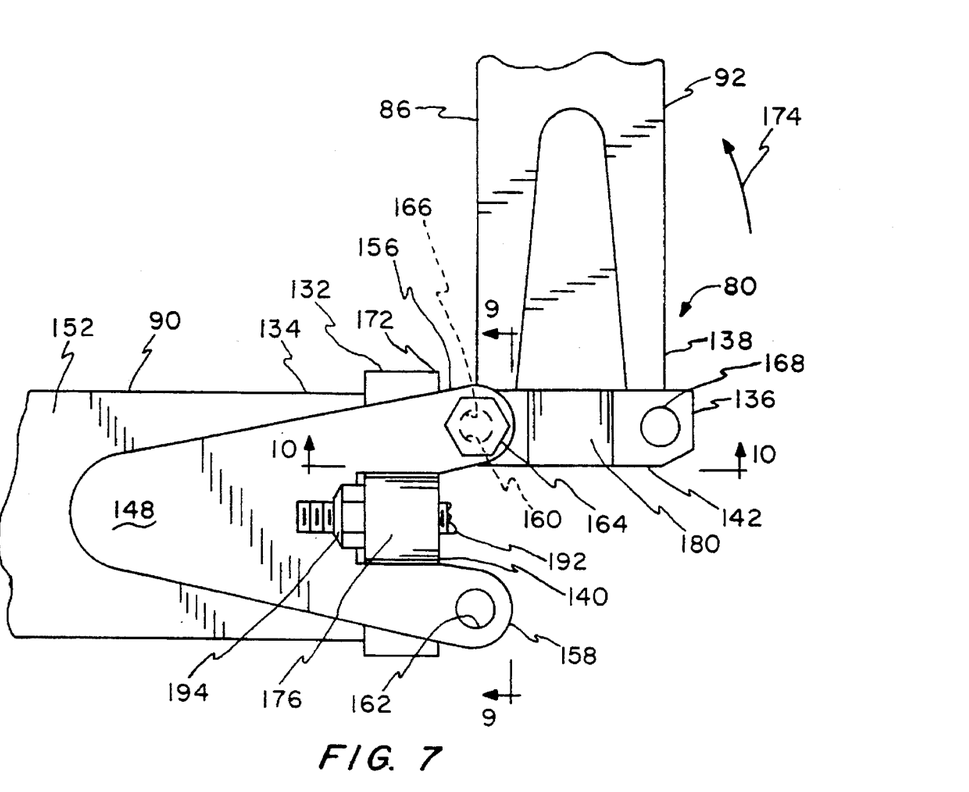
FIG. 7 is a view as in FIG. 6 with a first portion of the elongate body broken away from the second portion of the elongate body.
Figure 8:
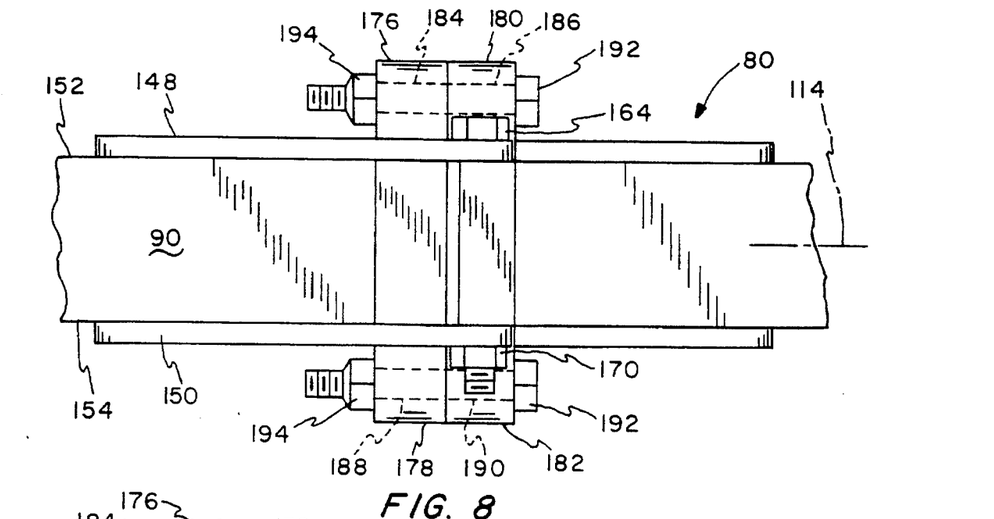
FIG. 8 is an enlarged, end elevation view of the inventive breakaway connection.
Figure 9:
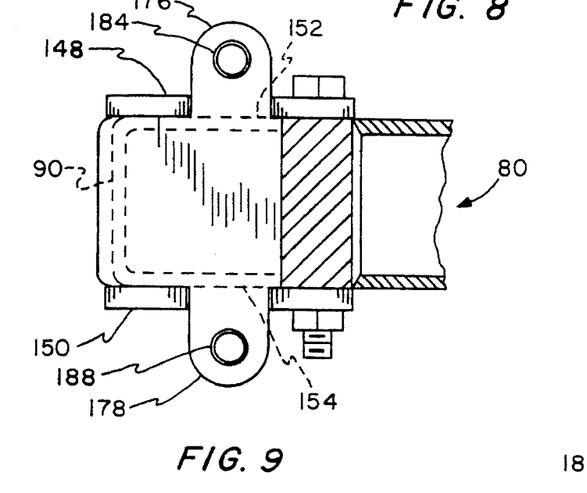
FIG. 9 is an enlarged, side elevation view of a stationary portion of the elongate body taken along line 9—9 of FIG. 7.
Figure 10:
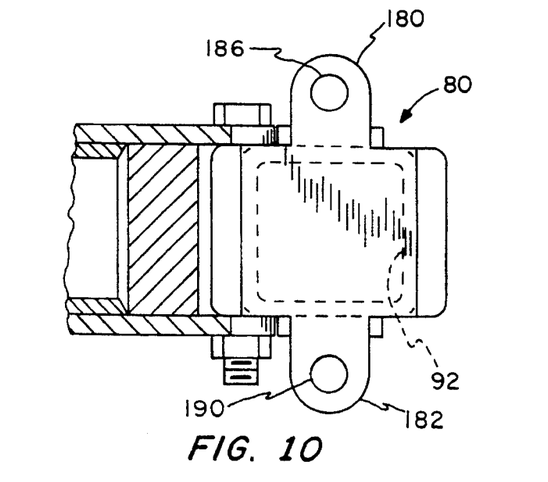
FIG. 10 is an enlarged, side elevation view of a repositionable portion of the elongate body, taken along line 10—10 of FIG. 7.

With the body portions 90, 92 in operative relationship, as seen in FIG. 6, the plates 148, 150 straddle the plate 136 on the proximal end of the body portion 92. The plate 132 has vertical bores 166, 168 therethrough which align with the bores 160, 162, respectively in the plate 148.

When a left-handed soil marking apparatus is desired, the bolt 164 is directed downwardly through the plate 148, through the bore 166, through the plate 150 and is secured thereto by a nut 170. The body portion 92 is thus free to pivot about the axis 144 defined by the bolt 164 between the operating position of FIG. 6 and the released position of FIG. 7. The plate 132 has a comer 172 that abuts to the surface 86 to limit rearward pivoting movement in the direction of the arrow 174.

By directing the bolt 164 downwardly through the bore 162, through the bore 168 in the plate 136, and through the bottom plate 150, the bolt 164 defines the second pivot axis 146 for right-handed operation. By changing the location of the bolt 164, the apparatus 80 can be simply converted back and forth between right- and left-handed operation.

By placing a bolt 164 in both positions, the breakaway feature, as described in detail hereafter, is defeated. The two bolts 164 then define a rigid connection between the body portions 90, 92.

The breakaway feature is afforded by providing bolt mounting blocks 176, 178 on the top and bottom at the distal end 134 of the body portion 90, and bolt mounting blocks 180, 182 on the top and bottom of the proximal end 138 of the body portion 92. The bolt mounting blocks 176, 180 have through bores 184, 186 which align with the body portions 90, 92 in the operative position of FIG. 6. The bolt mounting blocks 178, 182 have like, alignable, through bores 188, 190.

With the body portions 90, 92 in the operative position of FIG. 6, bolts 192 are directed through the blocks 176, 180 and 178, 182 and secured by nuts 194. The bolts 192 are aligned with the body axis 114, i.e. centrally between the body surfaces 86, 88. In a preferred form, the bolts 192 are at diametrically opposite locations with respect to the axis 114 on the top and bottom of the body 84. A grade 5, ½" bolt is suitable for this purpose.

In operation, the bolt 164 acts as a fulcrum. Upon the wheel 106 encountering an obstruction, the tensile force on the bolts 192 is increased. The bolts 192 are selected so that they will simultaneously fail in tension before a force is applied to the body 84 that might cause bending thereof or damage to the mounting plate 122 or frame 16 carded by the vehicle 12. Since the bolts 192 at the top and bottom of the body 84 are spaced equidistantly from the first and second axes 144, 146, the bolts 192 will theoretically break under the same force applied with the apparatus 80 used in both left- and right-handed operation.

Because the bolts 192 are spaced vertically from the neutral body axis 114, the bolts 192 counter bending forces imparted to the body 84 in operation. Further, the bolts 192 positively transmit a lifting force on the body portion 90 to the body portion 92.

Figure 4:
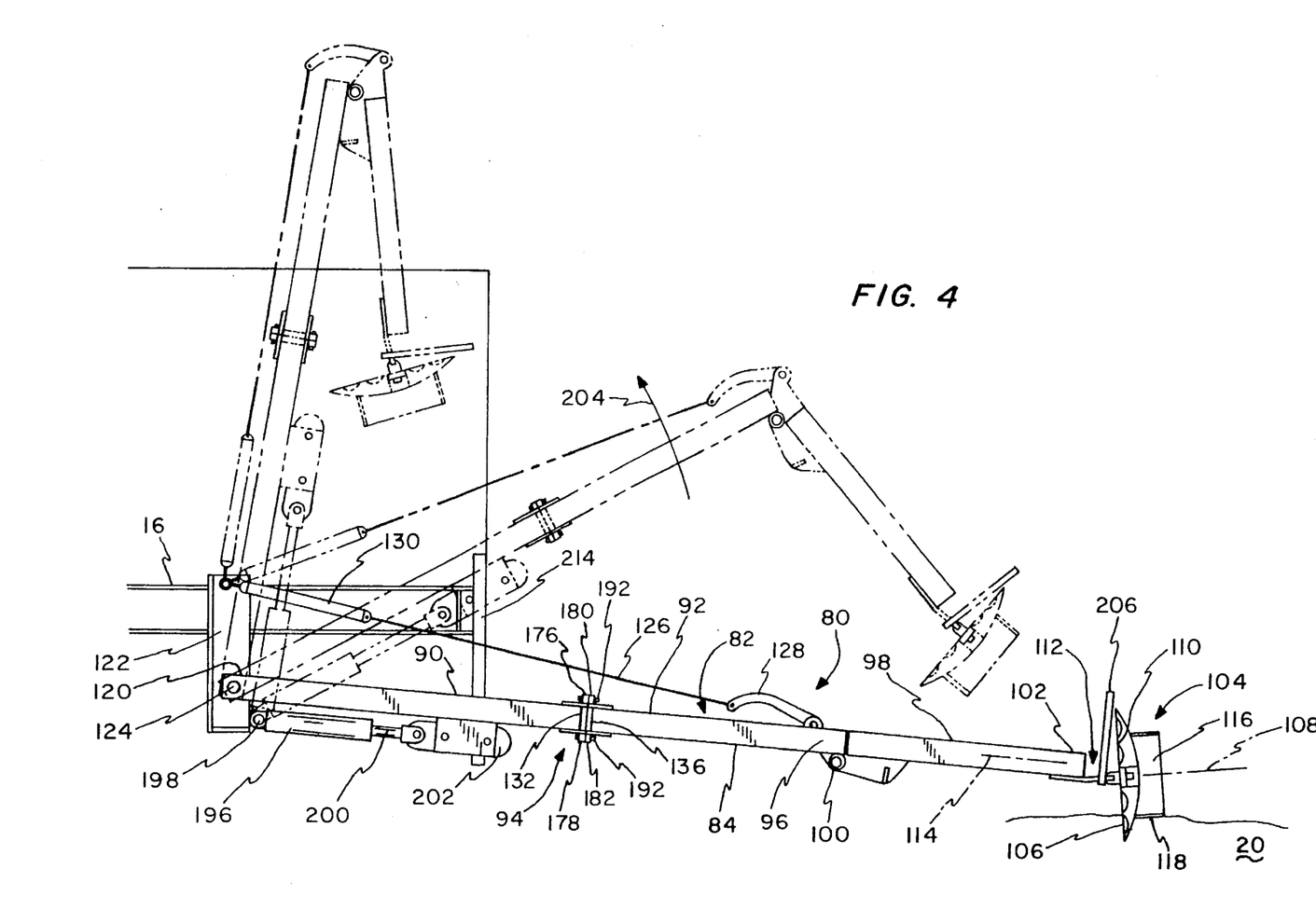
FIG. 4 is a from elevation view of the inventive apparatus for marking soil shown in its operative, partially folded, and fully folded positions.

This lifting force is imparted by an hydraulic cylinder 186, which has one end 198 pivotably connected to the mounting frame 122 for movement about a fore and aft axis. The cylinder has an extensible rod 200 that pivotably connects to a mounting plate 202 beneath the body 84 on the vehicle side of the connection 94. With the rod 200 retracted, the apparatus 80 is in the operative position shown in FIG. 4. By extending the rod 200, the body 84 is progressively moved in a counterclockwise direction in FIG. 4, as indicated by the arrow 204, until the fully retracted/folded position is realized. The operative position can be re-attained by retracting the cylinder rod 200.

If any repositioning of the wheel 106 is required in the operative position, this can be accomplished through a ting 206 adjacent to the wheel 106 that can be conveniently grasped and maneuvered by the user.

Figure 5:
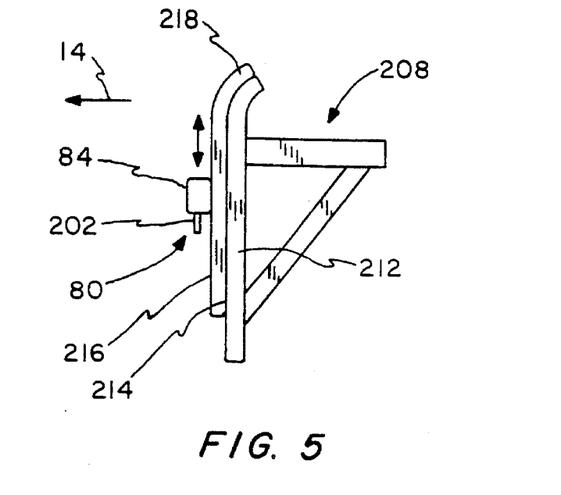
FIG. 5 is a side elevation view of the inventive soil marking apparatus in relationship to reinforcing structure on the towing vehicle.

The body 84 is substantially unsupported between the mounting frame 122 and the wheel 106. A reinforcing assembly 208 stabilizes the body 84. The reinforcing assembly 208 includes a frame 210 that is attached to the frame 16 carded by the vehicle 12. The frame 210 includes a vertically extending rub bar 212 having a low friction, high wear cover element 214 thereon. The cover element 214 defines a vertically extending shoulder 216 which bears against the body 84 between the mounting frame 122 and connection 94 as the body 84 is borne in a rearward direction in use.

The cover element 216 guides vertical movement of the body 84 during repositioning thereof. The cover element 214 facilitates the normal floating movement of the body 84 in use. To further guide the body 84, the cover element 214 is provided with a curved, upper entry portion 218, which progressively cams the lowering body 84 to its proper fore and aft position.

The foregoing disclosure of specific embodiments is intended to be illustrative of the broad concepts comprehended by the invention.

I claim:

1. An apparatus to be advanced in a travel direction by a vehicle for continuously marking underlying soil, said apparatus comprising:

an elongate body having first and second portions and substantially straight leading and trailing surfaces extending over a substantial length of the elongate body;

means at a first location on said elongate body for engaging and marking underlying soil as the soil marking apparatus is advanced over underlying soil;

means for connecting the elongate body to a vehicle to advance the soil marking apparatus over underlying soil; and first means cooperating between the first and second elongate body portions for allowing the first portion of the elongate body to reposition relative to the second portion of the elongate body upon the first portion of the elongate body being acted upon by a predetermined force applied in a first direction at a first point, said first cooperating means including a) a first element having a predetermined tensile strength, b) means for operatively engaging the first element with each of the first and second portions of the elongate body so that a force in excess of the predetermined force applied to the first elongate body portion at the first point in said first direction causes the first element to fall in tension, and c) second means cooperating between the first and second elongate body portions for allowing the first elongate body portion to move guidingly relative to the second elongate body portion under a force applied to the first elongate body portion at the first point in said first direction with the first element failed in tension, said first element residing between the leading and trailing surfaces of the elongate body.

2. The apparatus for continuously marking soil according to claim 1 wherein the elongate body has a top and bottom and the first element is on one of the top and bottom of the elongate body.

3. The apparatus for continuously marking soil according to claim 1 wherein the elongate body has a lengthwise axis and the first element has a length with an axis that is substantially aligned between the leading and trailing surfaces of the elongate body with the lengthwise axis of the elongate body.

4. The apparatus for continuously marking soil according to claim 1 wherein the means for engaging and marking underlying soil comprises a toothed, rotary wheel.

5. The apparatus for continuously marking soil according to claim 1 wherein the second means comprises means for allowing the first elongate body portion to pivot relative to the second elongate body portion about a substantially vertically extending axis.

6. The apparatus for continuously marking soil according to claim 1 wherein the second means includes a pin extending through aligned bores in the first and second elongate body portions.

7. The apparatus for continuously marking soil according to claim 1 in combination with a mounting frame and the connecting means comprises means for attaching the elongate body to the mounting frame so that the elongate body can pivot relative to the mounting frame in a predetermined range.

8. The apparatus for continuously marking soil according to claim 7 including a flexible line extending between the frame and elongate body for limiting movement of the elongate body relative to the frame in one pivoting direction.

9. The apparatus for continuously marking soil according to claim 1 in combination with a vehicle for advancing the apparatus for continuously marking soil over underlying soil, there being means at a second location on the elongate body for attaching the elongate body to the vehicle, there further being a reinforcing shoulder on the vehicle for bearing against rite elongate body at a third location between the first and second locations as the elongate body is advanced by the vehicle, said elongate body being unsupported at said third location.

10. The apparatus for continuously marking soil according to claim 9 wherein the first means resides between the shoulder on the vehicle and the first location.

11. An apparatus for continuously marking soil according to be advanced in a travel direction by a vehicle for continuously marking underlying soil, said apparatus comprising:

an elongate body having first second portions and leading and trailing surfaces;

12. The apparatus for continuously marking soil according to claim 11 wherein the elongate body has a lengthwise axis and the first and second elements are on diametrically opposite sides of the lengthwise axis of the elongate body.

13. The apparatus for continuously marking soil according to claim 13 wherein the elongate body has a top and bottom and one of the elements is at the top of the elongate body and the other of the elements is at the bottom of the elongate body.

14. An apparatus to be advanced in a travel direction by a vehicle for continuously marking underlying soil, said apparatus comprising:

an elongate body having first and second portions and leading and trailing surfaces;

means at a first location on said elongate body for engaging and marking underlying soil as the soil marking apparatus is advanced over underlying soil;

means for connecting the elongate body to a vehicle to advance the soil marking apparatus over underlying soil; and first means cooperative between the first and second elongate body portions for allowing the first portion of the relative to the second portion of the elongate body upon the first portion of the elongate body being acted upon by a predetermined force applied in a first direction at a first point, said first cooperating means including a) a first element having a predetermined tensile strength, b) means for operatively engaging the first element with each of the first and second portions of the elongate body so that a force in excess of the predetermined force applied to the first elongate body portion at the first point in said first direction causes the first element to fail in tension, and c) second means cooperating between the first and second elongate body portions for allowing the first elongate body portion to move guidingly relative to the second elongate body portion under a force applied to the first elongate body portion at the first point in said first direction with the first element failed in tension, said first element residing between the leading and trailing surfaces of the elongate body, there further being removable means acting between the first and second elongate body portions for preventing the first element from failing in tension as a result of the predetermined force being applied in a first direction at the first point on the first elongate body portion.

15. The apparatus for continuously marking soil according to claim 14 wherein the removable means for preventing the first and second elongate body portion from failing comprises a pin extending through aligned bores in the first and second elongate body portions.

16. The apparatus for continuously marking soil according to claim 15 wherein the elongate body has a lengthwise axis, the second means includes a pin extending through aligned bores in the first and second elongate body portions, and the pins are on diametrically opposite sides of the axis of the elongate body.

17. An apparatus to be advanced in a travel direction by a vehicle for continuously marking underlying soil, said apparatus comprising:

an elongate body having first and second portions and leading and trailing surfaces:

means at a first location on said elongate body for engaging and marking underlying soil as the soil marking apparatus is advanced over underlying soil:

means for connecting the elongate body to a vehicle to advance the soil marking apparatus over underlying soil; and first means cooperating between the first and second elongate body portions for allowing the first portion of the elongate body to reposition relative to the second portion of the elongate body upon the first portion of the elongate body being acted upon by a predetermined force applied in a first direction at a first portion said first cooperating means including a) a first element having a predetermined tensile strength, b) means for operative engaging the first element with each of the first and second portions of the elongate body so that a force in excess of the predetermined force applied to the first elongate body portion at the first point in said first direction causes the first element to fail in tension, and c) second means cooperating between the first and second elongate body portions for allowing the first elongate body portion to move guidingly relative to the second elongate body portion under a force applied to the first elongate body portion at the first point in said first direction with the first element failed in tension, said first element residing between the leading and trailing surfaces of the elongate body, wherein the second means comprises means for allowing the first elongate body portion to pivot relative to the second elongate body portion selectively about first and second different vertically extending axes.

18. An apparatus to be advanced in a travel direction by a vehicle for continuously marking underlying soil, said apparatus comprising:

an elongate body having first and second portions and leading and trailing surfaces;

means at a first location on said elongate body for engaging and marking underlying soil as the soil marking apparatus is advanced over underlying soil;

means for connecting the elongate body to a vehicle to advance the soil marking apparatus over underlying soil;

first means cooperating between the first and second elongate body portions for allowing the first portion of the elongate body to reposition relative to the second portion of the elongate body upon the first portion of the elongate body being acted upon by a first predetermined force applied in a first direction at a first point on the first elongate body portion;

repositionable means acting between the first and second elongate body portions for a) preventing the first elongate body portion from repositioning relative to the second portion of the elongate body upon the first portion of the elongate body being acted upon by said first predetermined force in the first direction with the repositionable means in a first position relative to the elongate body and b) allowing the first elongate body portion to reposition relative to the second portion of the elongate body upon the first portion of the elongate body being acted upon by said first predetermined force at the first point in the first direction with the repositionable means in a second position relative to the elongate body.

19. The apparatus for continuously marking soil according to claim 18 wherein the repositionable means comprises a first pin extending through first aligned bores in the first and second elongate body portions.

20. The apparatus for continuously marking soil according to claim 18 wherein the elongate body has a central axis and the first means includes a pin and means for operatively engaging the pin, the first and second elongate body portions so that the pin fails in tension upon the first predetermined force being applied in the first direction at the first point on the first elongate body portion, wherein the first pin is vertically spaced from the central axis of the elongate body.

21. The apparatus for continuously marking soil according to claim 18 wherein the first portion of the elongate body repositions relative to the second portion of the elongate body by pivoting and there are means cooperating between the first and second elongate body portions for limiting pivoting movement of the first elongate body portion relative to the second elongate body portion in response to said first predetermined force being applied in the first direction at said first point on the first elongate body portion.

22. An apparatus to be advanced in a travel direction by a vehicle for continuously marking underlying soil, said apparatus comprising:

an elongate body having first and second portions and leading and trailing surfaces;

means at a first location on said elongate body for engaging and marking underlying soil as the soil marking apparatus is advanced over underlying soil;

means for connecting the elongate body to a vehicle to advance the soil marking apparatus over underlying soil; first means cooperative between the first and second elongate body portions for allowing the first portion of the elongate body to reposition relative to the second portion of the elongate body upon the first portion of the elongate body being acted upon by a first predetermined force applied in a first direction at a first point on the first elongate body portion:

repositionable means acting between the first and second elongate body portions for a) preventing the first elongate body from repositioning relative to the second portion of the elongate body upon the first portion of the elongate body being acted upon by said first predetermined force in the first direction with the repositionable means in a first position relative to the elongate body and b) allowing the first elongate body portion to reposition relative to the second portion of the elongate body upon the first portion of the elongate body being acted upon by said first predetermined force at the first point in the first direction with the repositionable means in a second position relative to the elongate body, wherein the repositionable means comprises a first pin extending through first aligned bores in the first and Second elongate body portions, wherein the first pin in said first position defines a first pivot axis for relative movement between the first and second elongate body portions, and the first cooperating means includes a removable second pin extending through second aligned bores in the first and second elongate body portions to define a second pivot axis for relative movement between the first and second elongate body portions, said first and repositionable means comprising means for allowing the first portion of the elongate body to reposition relative to the second portion of the elongate body upon the first portion of the elongate body being acted upon by a second predetermined force applied oppositely to the first direction at a first position on the first elongate body portion whereby a) with the first pin in said first position and the second pin removed, the first elongate body portion pivots relative to the second elongate body portion upon a force in excess of the second predetermined force acting oppositely to the first direction at the first point on the first elongate body portion and b) with the second pin extending through the second aligned bores and the first pin removed, the first elongate body portion pivots relative to the second elongate body portion upon a force in excess of the first predetermined force acting in the first direction at the first point on the first elongate body portion.

23. An apparatus to be advanced in travel by direction by a vehicle for continuously marking underlying soil, said apparatus comprising:

an elongate body having first and second portions and leading and trailing surfaces;

means at a first location on said elongate body for engaging and marking underlying soil as the soil marking apparatus is advanced over underlying soil;

means for connecting the elongate body to a vehicle to advance the soil marking apparatus over underlying soil;

first means cooperating between the first and second elongate body portions for allowing the first portion of the elongate body to reposition, relative to the second portion of the elongate body upon the first portion of the elongate body being acted upon by a first predetermined force applied in a first direction at a first point on the first elongate body portion;

repositionable means acting between the first and second body portions for a) preventing the first elongate body portion from repositioning relative to the second portion of the elongate body upon the first portion of the elongate body being acted upon by said first predetermined force in the first direction With the repositionable means in a first position relative to the elongate body and b) allowing the first elongate body portion to reposition relative to the second portion of the elongate body upon the first portion of the elongate body being acted upon by said first predetermined force at the first point in the first direction with the repositionable means in a second position relative to the elongate body, wherein the first means includes first and second pins and means for operatively engaging the first and second pins with the first and second elongate body portions so that the first and second pins fail in tension upon the first predetermined force being applied in the first direction at the first point on the first elongate body portion.

* * * * *